Mar. 27, 1923.
T. J. HINTON ET AL
AUTOMOBILE TAIL LIGHT AND SIGNAL
Filed Mar. 28, 1922
1,449,859
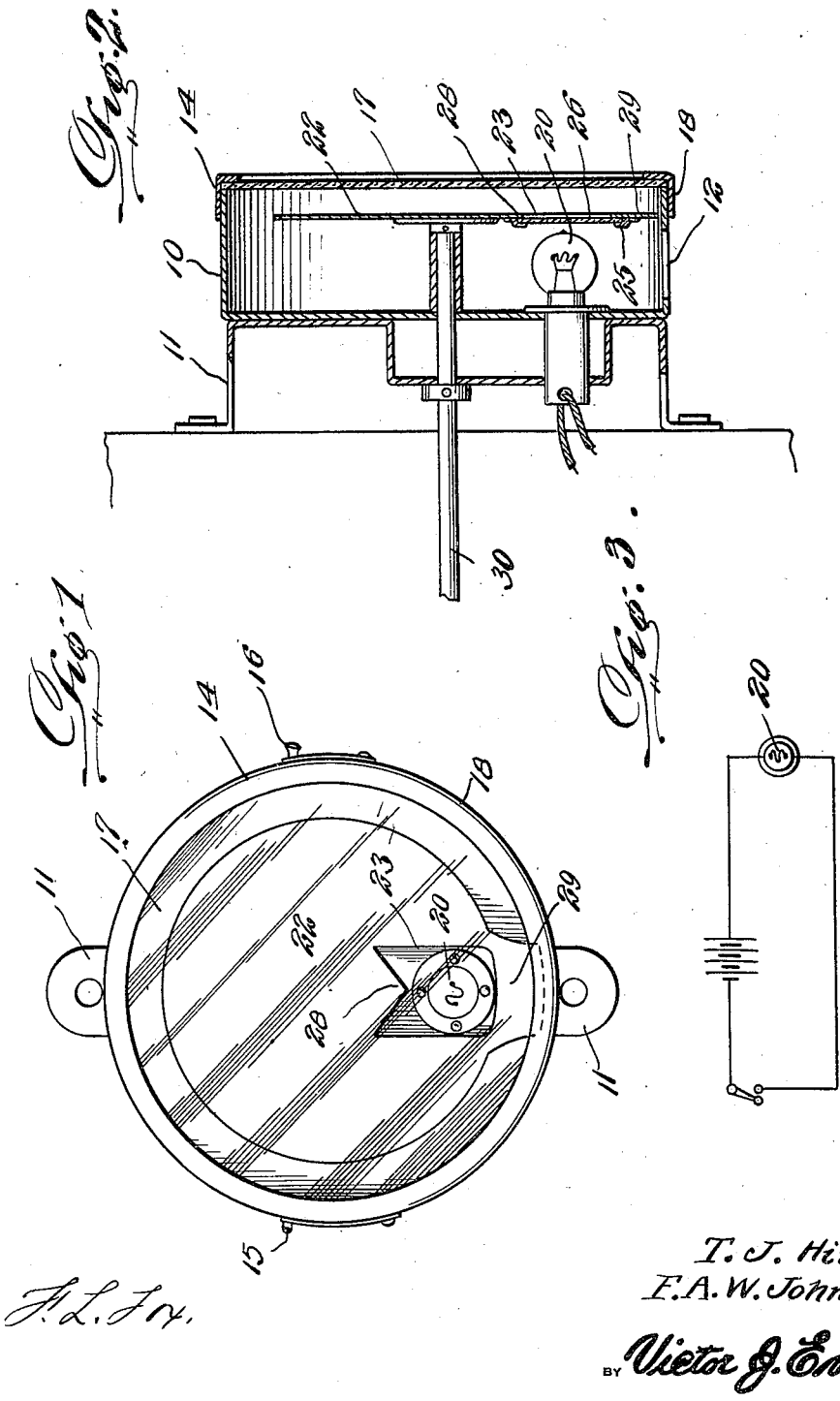

Patented Mar. 27, 1923.

1,449,859

UNITED STATES PATENT OFFICE.

THOMAS JAMES HINTON AND FRANK A. W. JOHNSON, OF FORT DODGE, IOWA.

AUTOMOBILE TAIL LIGHT AND SIGNAL.

Application filed March 28, 1922. Serial No. 547,521.

*To all whom it may concern:*

Be it known that we, THOMAS JAMES HINTON and FRANK A. W. JOHNSON, citizens of the United States, residing at Fort Dodge, in the county of Webster and State of Iowa, have invented new and useful Improvements in Automobile Tail Light and Signals, of which the following is a specification.

This invention relates to an automobile tail light and signal, and the object is to provide a device of this type which shall include a rotatable signal comprising a circular element spaced from the walls of a casing in which it is mounted, said element being formed to define a plurality of pointers outlined against illuminated fields.

A still further object is to provide a rear lamp casing, a lamp therein, a rotatable element having a solid portion and a cutaway portion, the solid portion normally obstructing the direct rays from the lamp, but the latter being visible through the cutaway portion, as a danger signal, when the rotatable element is moved to a given position, indicating that the car carrying the device will stop or move rearwardly.

With the foregoing and other objects in view, the invention consists in the novel construction and arrangement of elements described and claimed, it being understood that modifications may be made within the scope of the claims, without departing from the spirit of invention.

In the drawings, Figure 1 is a face view of the signal, constituting a rear elevation when the device is in operative position on a vehicle; Figure 2 is a vertical section; Figure 3 is a diagrammatic view of the lamp circuit.

The lamp casing 10 is mounted on a bracket 11 secured in a suitable position at the rear of a car and preferably in position for throwing light rays through window 12 onto the license plate.

The casing is provided with a detachable cover 14, connected with the casing in any suitable manner, as by means of securing devices 15 and 16. A lens or glass 17 is retained by the flange 18 of the cover.

Within the casing 10 I mount a lamp 20, the globe or bulb being preferably colored red. This lamp is located as shown, that is in the lower portion of the casing 10.

The rotatable signal per se is designated 22 and is provided with a cutaway portion 23, formed as shown. A plate or frame 25 having the general configuration of the opening is secured to the plate 22, and provides means for mounting a transparent element 26, through which the light rays are visible. This element last named is however not essential to the operation of the device. The element 23 and the inner walls of the casing are coated or covered with reflecting material, or with a reflecting coating, and the reflected rays from the lamp appear through opening 23 regardless of the position of the rotatable signal 22. The central projecting device 28 and the outer projecting element 29 act as pointers, and when these elements point upwardly, the signal is read straight ahead. If the signal points to the right or to the left, such position indicates a right or left hand turn, as the case may be, and if the point is directed downwardly, the direct rays of the red lamp are visible and the signal indicates stop, or indicates that the car will back up or proceed rearwardly.

The disk 22 is controlled by a shaft 30, to be rotated in any suitable manner.

The controlling means located adjacent to the driver's seat includes a crank arm 35, and the connections are such that the position of the crank will indicate the position of the pointer or pointers of the rotatable element 22. The crank arm 35 is mounted on a shaft 36 carrying a pinion 37 meshing with a pinion 38 on longitudinal shaft 39, the latter extending rearwardly and serving to mount the rotatable signal 22.

The gearing just referred to is mounted in a casing 40 provided with bearings for the shafts, the casing being mounted on a base 41 to be secured to the floor of the car.

The operation of the device having been disclosed in connection with the description of the construction, no further explanation thereof is believed to be required.

It will be observed however that the diameter of the rotatable signal is less than the diameter of the circular portion of the casing, so that reflected light rays may pass through the annular space adjacent to the edges of the signal, the direct rays from the lamp passing through the opening of the signal when the latter is in the position making that result possible.

Having thus described the invention, we claim:

1. In a device of the class described, a lamp casing, a colored lamp mounted therein, a rotatable flat circular signal element mounted in the casing and having its edge portion spaced from the walls of the casing, the signal including a solid portion and a cutaway portion defining a pointer, the solid portion obstructing the direct rays of the lamp toward the rear, means for rotating said signal, said means last named including a device indicating the extent of rotation.

2. In a device of the class described, a rotatable flat circular signal including an opening therein defining a pointer, a colored lamp positioned behind the signal, a casing for said signal and lamp and proportioned to permit reflected light rays to pass around the outer edges of the signal, the direct rays being invisible at times from a point in the rear, and the direct rays from the lamp being visible as a warning when the aforesaid opening is directly opposite the lamp and an indicating device projecting from the circular signal outwardly across the space through which the reflected light rays pass around said signal.

In testimony whereof we affix our signatures.

THOMAS JAMES HINTON.
FRANK A. W. JOHNSON.